(12) United States Patent
Van Druten et al.

(10) Patent No.: US 7,410,436 B2
(45) Date of Patent: Aug. 12, 2008

(54) TRANSMISSION SYSTEM AND METHOD FOR DRIVING A VEHICLE

(76) Inventors: Roëll M. Van Druten, Woenselsemarkt 30c, Eindhoven (NL) NL-5612 CR; Bas G. Vroemen, Hagenkampweg Zuld 202, Eindhoven (NL) NL-5615 DB; Alexander F. A. Serrarens, Willem Kloosiaan 83, Eindhoven (NL) NL-5615 NM ( * ) Notice: Subject to any disclaimer, the term of this patent is extended or adjusted under 35 U.S.C. 154(b) by 76 days.

(21) Appl. No.: 10/498,022

(22) PCT Filed: Dec. 6, 2002

(86) PCT No.: PCT/NL02/00803

§ 371 (c)(1),
(2), (4) Date: Dec. 20, 2004

(87) PCT Pub. No.: WO03/047898

PCT Pub. Date: Jun. 12, 2003

(65) Prior Publication Data

US 2005/0107204 A1 May 19, 2005

(30) Foreign Application Priority Data

Dec. 6, 2001 (NL) .................................... 1019503
Aug. 9, 2002 (NL) .................................... 1021241
Sep. 18, 2002 (NL) .................................... 1021482
Oct. 29, 2002 (NL) .................................... 1021776

(51) Int. Cl.
*F16H 3/72* (2006.01)

(52) U.S. Cl. .............. 475/5; 475/1; 180/65.2; 180/65.4; 180/65.6

(58) Field of Classification Search ............ 475/1, 475/5; 180/65.2, 65.3, 65.4, 65.6
See application file for complete search history.

(56) References Cited

U.S. PATENT DOCUMENTS 4,471,668 A 9/1984 Elsner (Continued)

FOREIGN PATENT DOCUMENTS

DE 101 16 989 10/2002

(Continued)

OTHER PUBLICATIONS

E-Automat Automatikgetriebe Mit Esprit; Tenberge P; VDI Berichte, No. 1610, 2001, pp. 455-479, Duesseldorf, DE.

(Continued)

*Primary Examiner*—David D. Le
(74) *Attorney, Agent, or Firm*—Vista IP Law Group LLP

(57) ABSTRACT

A vehicle (1) has an epicyclic gearing (3) with three rotational members (5, 7, 9). Rotational member (9) is connected to a load formed by the wheels (17) of a vehicle. Rotational member (5) is connected to a flywheel (11) and rotational member (7) is connected to an engine (13). The vehicle (1) furthermore comprises a transmission-unit (19), embodied either as a conventional or as a automated manual transmission-unit, with two in/outputs (21, 23). In/output (21) is connected to the rotational member (7) and in/output (23) is connected to the third rotational member (9). A force-closed clutch (25) with slip capacity is located between in/output (21) and rotational member (7). With this transmission-system, the wheels (17) remain driven by the engine (13), also during disengagement of the clutch (25).

19 Claims, 6 Drawing Sheets

U.S. PATENT DOCUMENTS

| | | | |
|---|---|---|---|
| 5,558,588 A * | 9/1996 | Schmidt | 475/5 |
| 5,558,589 A * | 9/1996 | Schmidt | 475/5 |
| 5,577,973 A | 11/1996 | Schmidt | |
| 5,730,675 A | 3/1998 | Yamaguchi | |
| 5,730,676 A * | 3/1998 | Schmidt | 475/5 |
| 6,090,005 A * | 7/2000 | Schmidt et al. | 475/5 |
| 6,527,658 B2 * | 3/2003 | Holmes et al. | 475/5 |
| 6,645,105 B2 * | 11/2003 | Kima | 475/5 |
| 2001/0022245 A1 | 9/2001 | Rogg | |
| 2002/0055407 A1 * | 5/2002 | Druten et al. | 475/207 |
| 2002/0082134 A1 | 6/2002 | Hirt et al. | |
| 2004/0157693 A1 * | 8/2004 | Anthoine et al. | 475/5 |

FOREIGN PATENT DOCUMENTS

| | | |
|---|---|---|
| EP | 0845618 | 6/1998 |
| EP | 1 209 017 | 5/2002 |
| FR | 2 824 509 | 11/2002 |

OTHER PUBLICATIONS

Patent Abstracts of Japan; Toyota Motor Corp.; Feb. 6, 2001, vol. 2000, No. 19.

Vroemen, Bas Gerard, "Component Control for The Zero Intertia Powertrain", thesis, Nov. 27, 2001, University Press Facilities, Eindhoven, The Netherlands.

Van Druten, Roell Marie, "Transmission Design of The Zero Inertia Powertrain", thesis, Nov. 27, 2001, University Press Facilities, Eindhoven, The Netherlands.

* cited by examiner

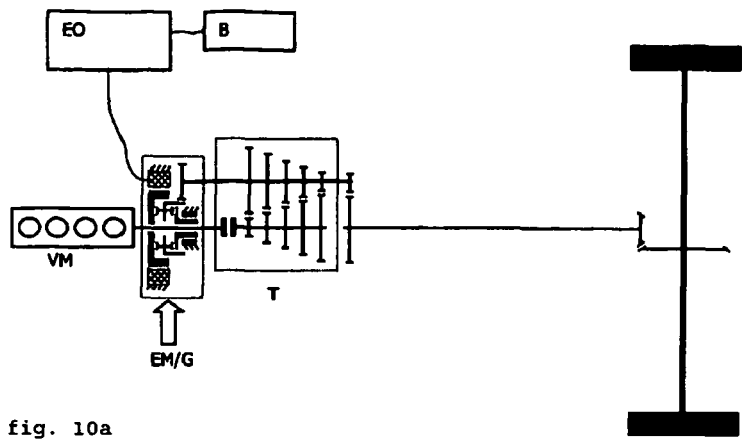
fig. 10a
FIG. 11
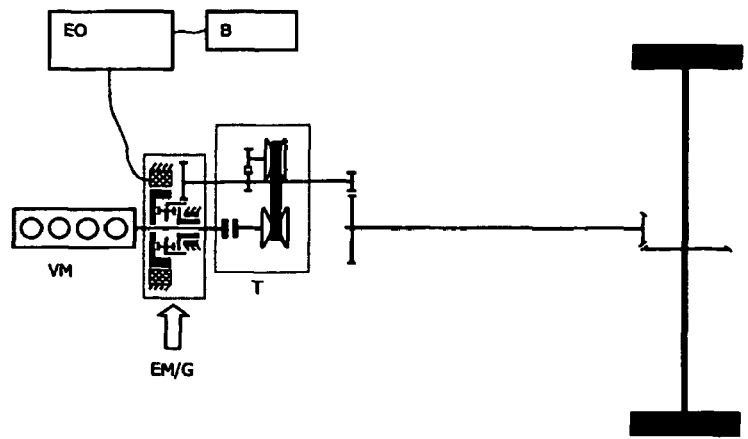
FIG. 12
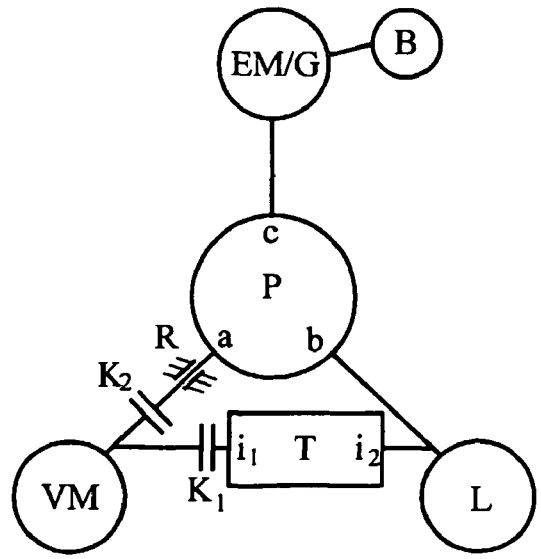
FIG. 13

TRANSMISSION SYSTEM AND METHOD FOR DRIVING A VEHICLE

This Application is a National Stage Filing under 35 U.S.C. § 371. This Application claims priority under 35 U.S.C. § 365 and any other applicable statutes, to International Application Serial No. PCT/NL02/00803, filed on Dec. 6, 2002, which itself claims priority to Dutch Application No. 1019503, filed on Dec. 6, 2001, Dutch Application No. 1021241, filed on Aug. 9, 2002, Dutch Application No. 1021482, filed on Sep. 18, 2002, and Dutch Application No. 1021776, filed on Oct. 29, 2002. The aforementioned Applications are incorporated by reference as if set forth fully herein.

DESCRIPTION

1. Field of the Invention

The invention relates to a transmission-system for a load comprising an epicyclic gearing with three rotational members, of which a first member is connected via a first node to an inertia that is part of the transmission-system, and where a second and third member can be connected via a second and third node, respectively, to two further inertias formed by a driving source and a load, and which transmission-system furthermore comprises a transmission-unit with two in/outputs, of which a first in/output is connected to one of the nodes and the second in/output is connected to another of the nodes. More particularly, the invention relates to a transmission-system for a vehicle, especially a passenger car or light-duty truck, where the load is mainly constituted by the driven wheels of the vehicle.

An inertia can be a flywheel, but also an electromotor/generator or a hydromotor/pump or a combination of two or more of these. An epicyclic gearing can be a planetary stage, possibly with double sun-, ring-, and planet-carrier-wheels or with stepped planets, but other epicyclic gearings can also be thought of, such as a differential gear or a crown-gear.

A node can be a connecting element, for instance a flange or a toothed shaft-end, for connecting to a further node in a larger assembly in which the transmission-system can be mounted. Moreover, a node can be a location on a continuous shaft, where, in case the transmission-system is mounted in a larger assembly, for instance a shaft that is present in the larger assembly is replaced by the shaft of the transmission system or where the shaft of the transmission-system is replaced by the shaft of the larger assembly. In this case, no detachable connection is present at the node.

2. Technical State-of-the-Art

Such a transmission-system is known from the European patent application EP-A-0 952 023. This known transmission-system is especially suited for saving energy in vehicles. By applying said transmission-system with a flywheel, while using a smaller engine, it is attempted to maintain the acceleration response of a vehicle with a larger (more powerful) engine but without said transmission-system.

3. Summary of the Invention

An objective of the invention is to improve upon a transmission-system as described in the introduction. To this end, the transmission-system according to the invention is characterized in that between one of the in/outputs of the transmission-unit and the node connected to this in/output and/or between at least one of the rotational members of the epicyclic gearing and the node connected to this rotational member and/or between at least two of the rotational members of the epicyclic gearing, a clutch is present. This clutch can be a force-closed or a form-closed clutch, whereas the transmission-unit can be an Automated Manual Transmission (AMT), a Continuously Variable Transmission (CVT), a Manual Transmission (MT), an Automatic Transmission (AT) or a Dual Clutch Transmission (DCT). When applied in a vehicle, the transmission-unit can be positioned between the engine and the inertia, between the engine and the load or between the inertia and the load. Besides the earlier mentioned energy savings, applying one or more clutches in the transmission-unit can yield additional benefits, which depend on the position and on the method of operation of the clutch(es).

One of the main benefits is obtained in a configuration in which the second rotational member is connected to a driving source via the second node and the third node is connected to a load, and where the transmission-unit is located between the second and the third node and the clutch is positioned between the transmission-unit and the second node. In this configuration, the torque transmission from the driving source to the load is maintained during interruption of the transmission-unit for the purpose of changing the transmission ratio.

The inertia is the main reason that the torque from the driving source can be transmitted to the load (wheels) during the short intervals in which the clutch is disengaged. Besides this advantage, the transmission-system according to the invention has several other advantages depending on the number and location of the clutches.

An additional advantage is that the inertia, when embodied as a flywheel, can dampen oscillations of the engine torque, thus enabling a smaller engine-flywheel in case the engine is an internal combustion engine. In case the inertia is embodied as an electromotor/generator, engine torque oscillations can be dampened by active control of the electromotor torque.

A further embodiment of the transmission-system according to the invention is characterized in that at least one of the nodes is located on a shaft, on which shaft also a brake is present. Preferably a brake is located on the shaft that is to be connected to the driving source. By activating this brake the engine is halted. In this situation, the inertia can drive the load through the epicyclic gearing. Preferably, the inertia then comprises a machine that can function as a motor or as a generator, preferably an electromotor/generator. In that case, a purely electric propulsion is possible by applying the brake.

Furthermore, a brake is preferably present on the shaft connected to the inertia. This further brake is preferably force-closed and has benefits in combination with a clutch between the transmission-unit and the epicyclic gearing. By activating this brake while opening the clutch, the torque from an engine connected to the second node is transmitted to a load connected to the third node via the epicyclic gearing, thus creating one additional gear ratio besides the transmission ratios of the transmission-unit. This way, using a transmission-unit with five gear ratios, a transmission-system with six gear ratios can be obtained, or while retaining a total number of five gear ratios the transmission-unit can be equipped with one gear ratio less. Furthermore, activating this brake has benefits during upshifts of the transmission-unit, typically from first to second and from second to third gear, in which by closing the brake and opening the clutch the driving torque is shortly transmitted through the epicyclic gearing only, which is beneficial for the driving comfort. If the additional gear ratio obtained with the brake coincides with third gear, also the upshift from third to fourth gear can be improved by gradually closing the clutch while opening the brake, while the fourth gear was pre-selected.

A further preferred embodiment of the transmission-system according to the invention is characterized in that the ratio of the speeds of the in/outputs of the transmission-unit, in case all clutches are closed and the speed of the first rotational member that is connected to the inertia is zero under all circumstances, is between the lowest and the highest possible transmission ratio to the other two rotational members, and preferably in the middle of these two transmission ratios.

A further preferred embodiment of the transmission-system according to the invention is characterized in that the transmission-unit is of the constant-mesh type and has no synchro-meshes.

The invention also concerns a drive-unit comprising a driving source and a transmission-system according to the invention, wherein the driving source is connected to one of the two further nodes. The driving source can for instance be a combustion engine or an electromotor. An advantageous embodiment of the drive-unit according to the invention is characterized in that the driving source comprises a combustion engine as well as an electromotor/generator connected thereto. A further advantageous embodiment of the drive-unit according to the invention is characterized in that the driving source is a high-speed combustion engine that is relatively small and lightweight. Another advantageous embodiment of the drive-unit according to the invention is characterized in that the maximum of kinetic energy of the inertia and that of the driving source differ by no more than a factor of five.

The invention furthermore concerns a vehicle comprising driven wheels and a drive-unit according to the invention, wherein the driven wheels are connected to the other further node.

Furthermore, the invention concerns a method for preserving or increasing, preferably stepwise, the driving torque at the wheels of a motorized vehicle, which comprises a primary driving source as well as a transmission-unit and an epicyclic gearing with three rotational members, of which a first rotational member is connected to an inertia, such as a flywheel and/or a secondary driving source of the vehicle, where a in/output of the transmission-unit is connected to the driving source and to a second rotational member of the epicyclic gearing, and where the other in/output of the transmission-unit is connected to the wheels and to a third rotational member of the epicyclic gearing, in which method the primary driving source maintains or increases its torque.

Regarding the method, the invention is characterized in that the driving torque at the wheels is preserved or increased by interrupting the transmission unit, for instance by disengaging a clutch that is connected to the transmission-unit. In the transmission-system known from the European patent application EP-A-0 952 023, the transmission-system can not be interrupted since there is no clutch present for that purpose. At most, a clutch could be present directly connected to the output shaft of a combustion engine as driving source, but opening this clutch would disengage both the transmission-unit and the epicyclic gearing from the driving source, hence interrupting the driving torque. With respect to the method of operation, the invention is based on the insight that by interrupting the transmission-unit, the transmitted torque from the driving source to the load can be preserved or even increased by having the transmission path run through the epicyclic gearing where the inertia provides the reaction torque. This insight is both new and surprising.

In the method according to the invention, changing the torque at the wheels is achieved by opening the clutch (interrupting the transmission-unit) and not by (gradually) changing the transmission ratio as is done in the known transmission-system. This is a different transmission principle with fundamentally different torque ratios in the system. One advantage is the much faster, immediate torque change at the wheels (in the desired direction), without exerting a load on the transmission-unit at that moment. If the transmission-unit is a CVT, the additional clutch can yield an even larger advantage. The "elasticity" of the accelerator pedal of the known transmission-system largely depends on the shift speed of the CVT which in practice is limited by the size of the hydraulical or electrical actuation system. The novelty of the method of operation according to the invention is mainly constituted by the initiation of the torque change at the wheels, which happens immediately after the clutch is opened, because the transmission ratio of the epicyclic gearing differs from that of the last selected gear.

In order to enhance the possibilities for providing a reaction torque, one embodiment of the method according to the invention is characterized in that the vehicle comprises a brake which is connected to the first rotational member of the epicyclic gearing which member itself is connected to the inertia, the brake is activated during upshifts of the transmission-unit, which causes an increase in the torque transmission from the driving source to the wheels.

A further preferred embodiment of the method according to the invention is characterized in that the vehicle comprises a brake which is connected to the first rotational member of the epicyclic gearing which member itself is connected to the inertia, in which method the brake is activated during downshifts of the transmission-unit, towards a transmission ratio larger than the ratio of the speeds of the in/outputs of the transmission-unit in case all clutches are closed, and the speed of the first rotational member that is connected to the inertia is zero under all circumstances, in order to facilitate faster downshifting.

Another preferred embodiment of the method according to the invention is characterized in that an additional transmission ratio between the driving source and the wheels is obtained by halting the first rotational member of the epicyclic gearing that is connected to the inertia. In that case, the epicyclic gearing is used to create an additional transmission ratio besides the transmission ratios that the transmission-unit offers.

Yet another preferred embodiment of the method according to the invention is characterized in that an additional transmission ratio between the driving source and the wheels is obtained by connecting two of the three rotational members of the epicyclic gearing. Also in this case, the epicyclic gearing is used to create one or more additional transmission ratios besides the previously mentioned transmission ratios.

The above can be used advantageously in order to create an upshift without torque interruption. To this end, a further embodiment of the method according to the invention is characterized in that the first rotational member of the epicyclic gearing which is connected to the inertia is halted, or alternatively, two of the three rotational members are connected to each other so that a fixed transmission ratio is created between the primary driving source and the wheels, and in that the transmission-unit is shifted into a higher gear while a clutch that is connected to the transmission-unit is open, after which by closing this clutch and releasing all three rotational members, the transition is made towards a transmission ratio between the primary driving source and the wheels corresponding to a higher gear, without interruption of the driveline between the primary driving source and the wheels.

A further preferred embodiment of the method according to the invention is characterized in that the vehicle comprises a brake that is connected to the primary driving source and in that the inertia comprises a secondary driving source embodied as an electromotor, in which method the vehicle is driven forward and backward using the electromotor while the primary driving source is halted by the brake. The benefit of this is that the reverse gear can be omitted from the transmission-unit thus enabling the application of a less complicated transmission-unit.

Yet another preferred embodiment of the method according to the invention is characterized in that the vehicle comprises a first clutch positioned between the transmission-unit and the driving source, as well as a second clutch and a brake located between the second rotational member and the driving source, and in that the inertia comprises a machine that can function as a motor or as a generator, in which method the second clutch is opened and the brake is released after which the machine is accelerated independently, so that subsequently the vehicle can be launched or the transmission-unit can be upshifted under full load.

BRIEF DESCRIPTION OF THE DRAWINGS

In the following, the invention is further elucidated by drawings depicting several examples of configurations of the vehicle with the transmission-system according to the invention.

FIGS. 11 and 12 schematically depict several configurations of a rearwheel driven vehicle according to the invention;

FIG. 13 shows a further embodiment of the vehicle comprising the transmission-system according to the invention;

DETAILED DESCRIPTION OF THE DRAWINGS

Figure 1:
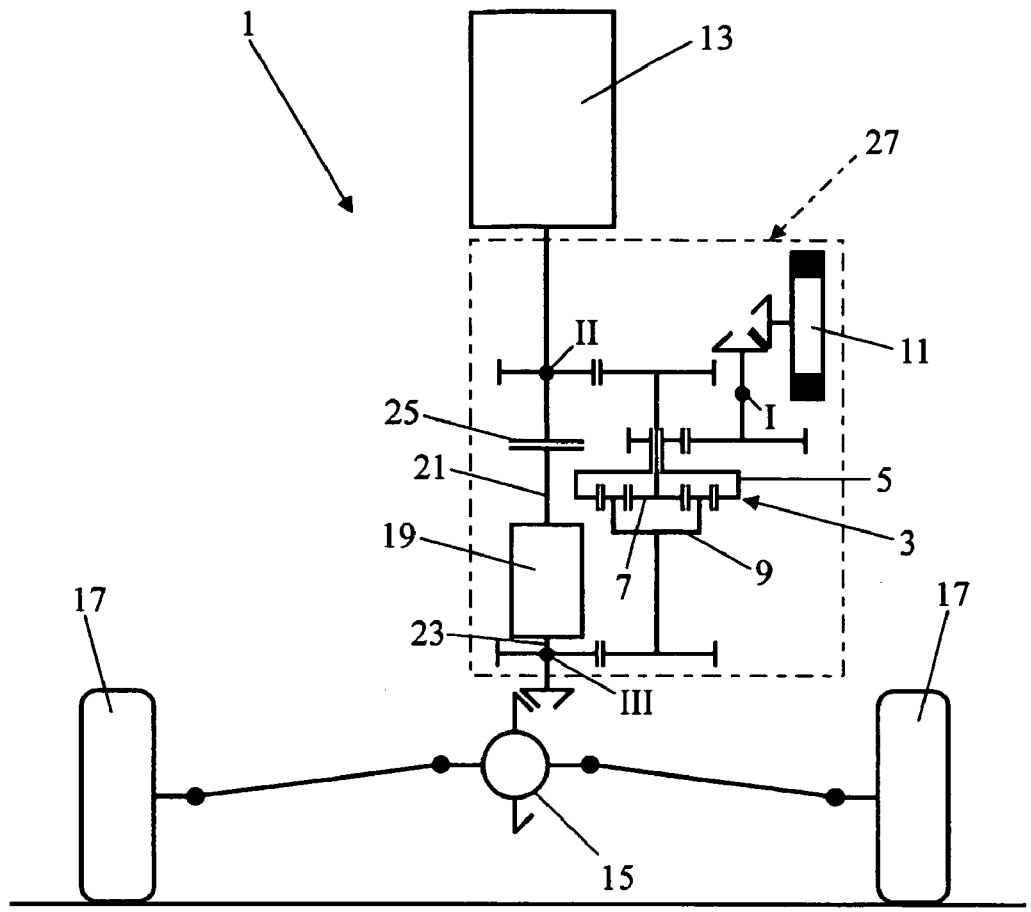
FIG. 1 depicts a first embodiment of the vehicle comprising the transmission-system according to the invention.

FIG. 1 schematically depicts the vehicle with the transmission-system according to the invention. The vehicle 1 has an epicyclic gearing 3, here embodied as a planetary stage with three rotational members 5, 7, 9, which in this embodiment are formed by a sun gear, a ring gear and a planet-carrier gear which holds the planet gears. In the following, any of these gears can be the first, second or third rotational member.

The first rotational member 5 is connected via a first node I to an inertia, here embodied as a flywheel 11. The second rotational member 7 is connected via a second node II to an engine 13, here embodied as a combustion engine, although in principle any type of motor can be applied, such as an electromotor. The third rotational member 9 is connected via a third node III, a final reduction and differential gear 15 to the wheels 17 of a vehicle that constitute the load in this case.

The vehicle 1 furthermore comprises a transmission-unit 19 with two in/outputs 21, 23, here embodied either as a conventional or as an automated manual transmission-unit, although any other conceivable transmission-unit might be applied, such as a continuously variable transmission-unit. One of the in/outputs 21 is connected to the second rotational member 7 and the other in/output 23 is connected to the third rotational member 9.

A clutch 25 is present between in/output 21 of the transmission-unit 19 and the second rotational member 7 of the epicyclic gearing 3. The clutch 25 is a force-closed clutch with slip capability. When clutch 25 is open, power is transmitted via the epicyclic gearing 3 to the wheels 17, instead of via the transmission-unit 19 in case clutch 25 is closed.

The epicyclic gearing, transmission-unit, flywheel and clutch together constitute the transmission-system 27 of the vehicle 1, whereas the transmission-system 27 with the engine 13 form the drive-unit of the vehicle.

Figure 2:
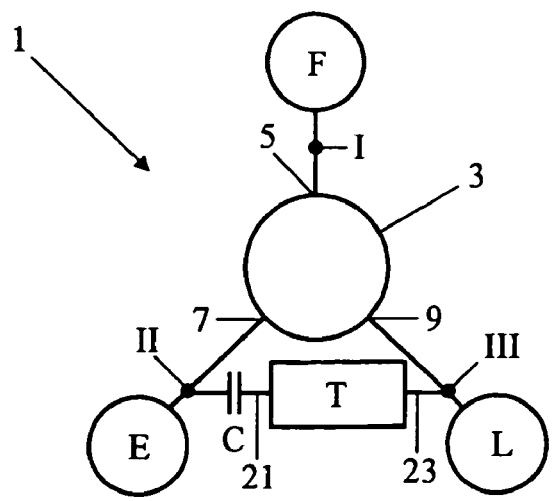
FIG. 2 depicts the vehicle of FIG. 1 in a diagram.

To elucidate the configuration and method of operation of the drive system, FIG. 2 schematically depicts the vehicle 1 in a diagram. The epicyclic gearing 3 is here depicted as a circle with three radially projecting lines that represent the connections with the rotational members 5, 7, 9. The engine, load and inertia are indicated by E, L and F, respectively, the transmission-unit by T and the clutch by C. The load is here the combination of the differential gear and the wheels.

Figure 3:
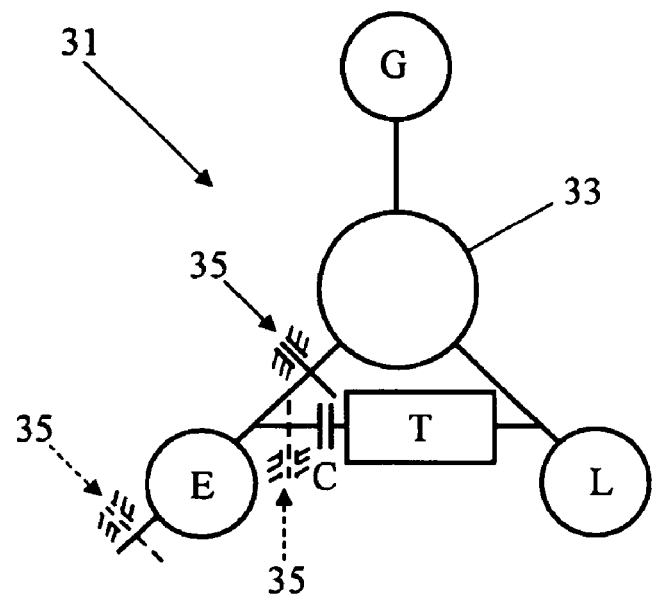
FIG. 3 schematically depicts a second embodiment of the vehicle according to the invention.

FIG. 3 schematically depicts a second embodiment of the vehicle 31 according to the invention. This second embodiment differs from the first depicted in FIGS. 1 and 2, in that the inertia is constituted by an electromotor G and a brake 35 is located between the engine E and the epicyclic gearing 33. This enables pure electric propulsion. By activating the brake 35 the engine E is halted. In that situation the electromotor G can drive the load L through the epicyclic gearing 33. The brake 35 can for instance be a force-closed or a form-closed brake or a one-way clutch equipped with a locking pawl.

Figure 4:
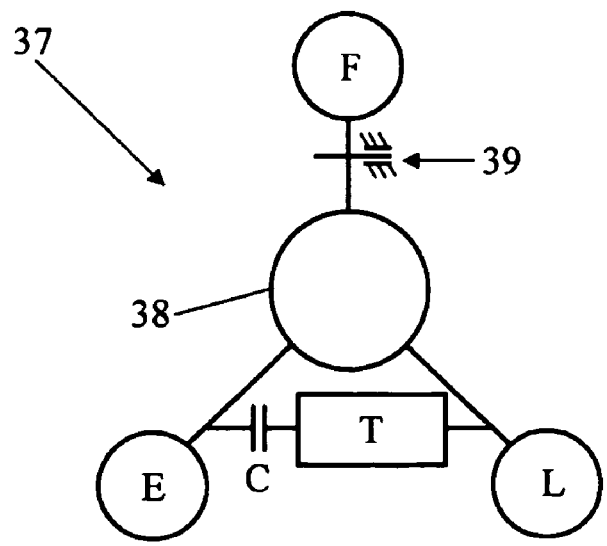
FIG. 4 schematically depicts a third embodiment of the vehicle according to the invention.

FIG. 4 schematically depicts a third embodiment of the vehicle 37 according to the invention. This third embodiment differs from the first depicted in FIGS. 1 and 2, in that a further brake 39 is located between the flywheel F and the epicyclic gearing 33. This further brake 39 is a force-closed brake. By activating this brake while opening the clutch, the engine torque is transmitted to the wheels via the epicyclic gearing, thus enabling more advantageous shifting, besides creating one additional transmission ratio by halting the rotational member.

Figure 5:
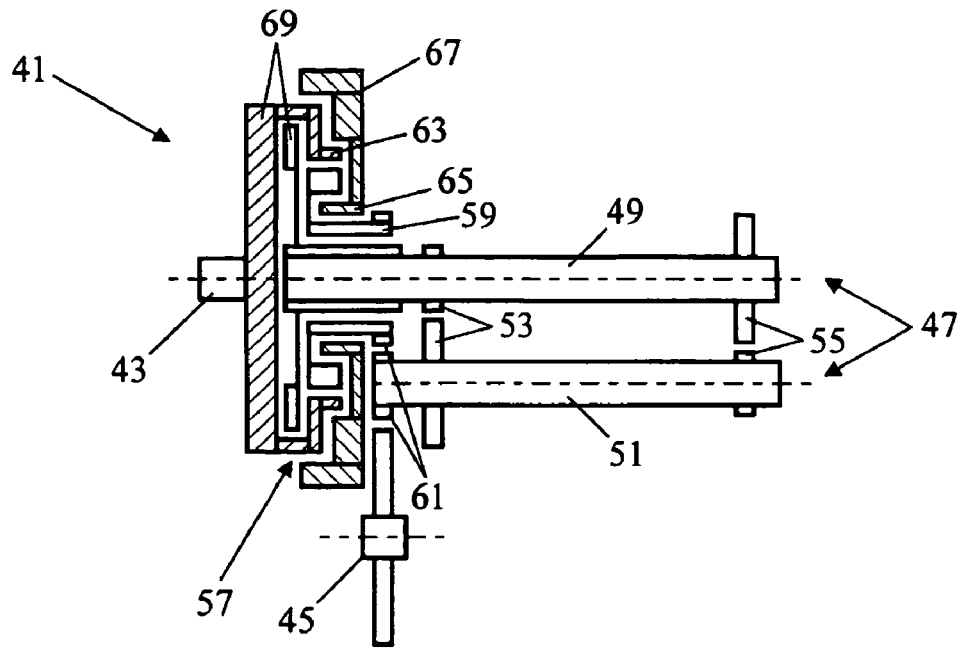
FIG. 5 shows a concrete practical embodiment of the transmission-system according to the invention.
Figure 6:
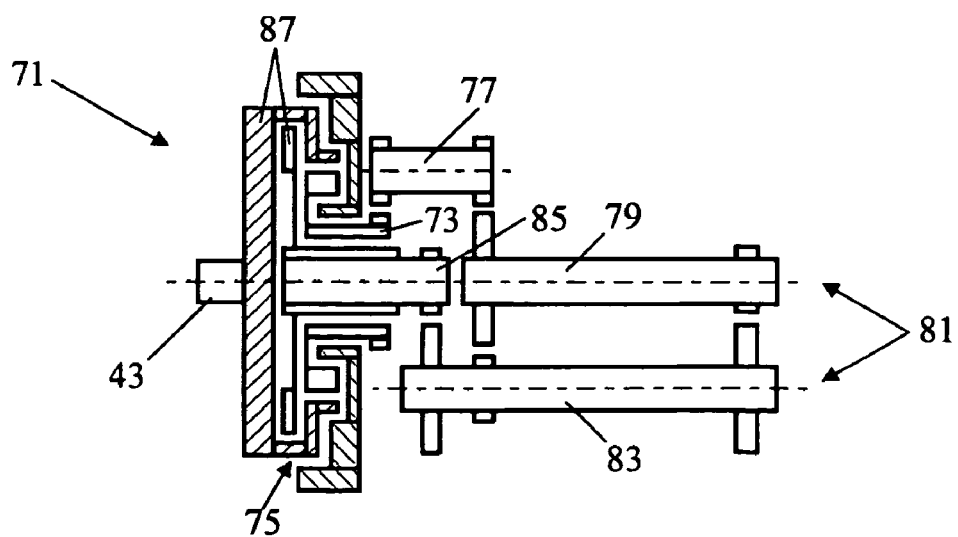
FIG. 6 depicts a further concrete practical embodiment of the transmission-system according to the invention.

FIGS. 5 and 6 depict two concrete practical embodiments of the transmission-system. FIG. 5 shows a transmission-system 41 especially suited for transversely mounted engines. The input shaft 43 of the transmission-system is connected to the engine and the output shaft 45 to the differential gear. Only the shafts 49, 51 of the transmission-unit 47, holding the gears 53, 55 of the highest and lowest transmission ratio are depicted. The secondary shaft 51 of the transmission-unit is connected to the output shaft 45 of the transmission-unit. The primary shaft 49 of the transmission-unit can be connected to the input shaft 43 of the transmission-system through a clutch 69.

A planetary stage 57 is located between the input shaft 43 and the primary shaft 49. The planet-carrier 59 is connected to the secondary shaft 51 of the transmission-unit via a gear reduction 61. The ring gear 63 is connected to the input shaft 43 and the sun gear 65 is connected to a flywheel 67. The clutch 69 is positioned between the planetary stage 57 and the input shaft 43.

FIG. 6 shows a further transmission-system 71 especially suited for longitudinally mounted engines. Here the planet-carrier 73 of the planetary stage 75 is connected via an auxiliary shaft 77 to the output shaft 79 of the transmission-system which is also the secondary shaft of the transmission-unit 81. The primary shaft 83 of the transmission-unit is connected to a further auxiliary shaft 85 which holds a clutch-half of clutch 87.

FIGS. 7 to 10 depict various vehicle configurations according to the invention, where the vehicle is frontwheel driven.

Figure 7:
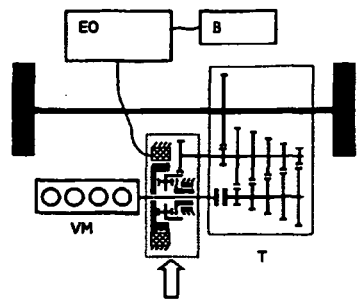
FIGS. 7 to 10 schematically depict several configurations of a frontwheel driven vehicle according to the invention.
Figure 8:
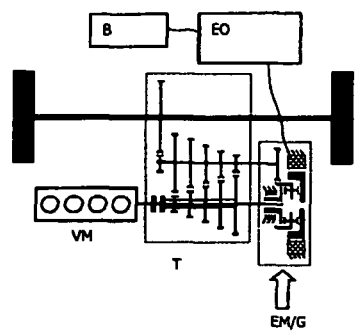
Figure 9:
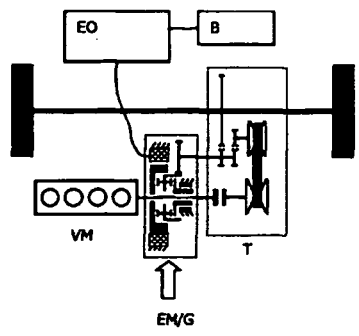
Figure 10:
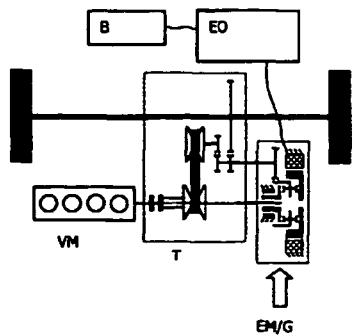
Figure 14:
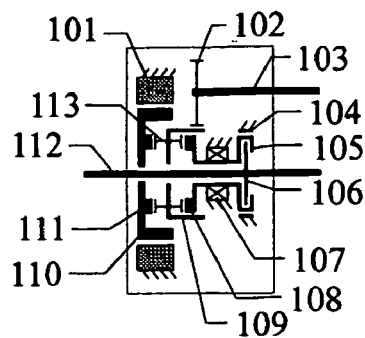
In FIGS. 14 to 17 several constructional variants of the electromotor/generator-unit shown in FIG. 13 are depicted as a module.
Figure 15:
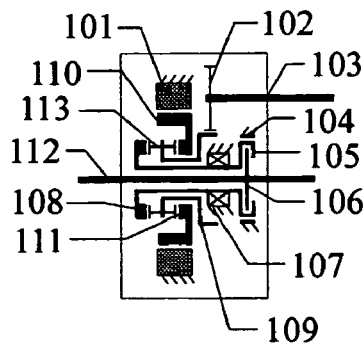
Figure 16:
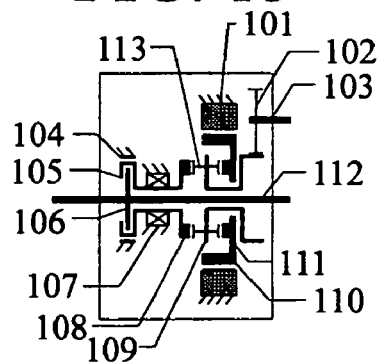
Figure 17:
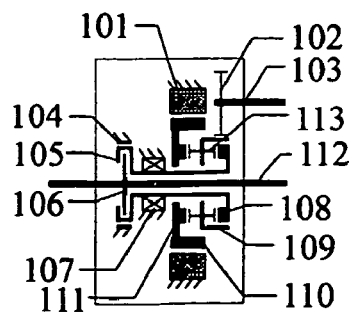

The vehicle comprises an inertia which is embodied as an electromotor/generator-unit EM/G and is positioned between the driving source, embodied as a combustion engine VM, and the transmission-unit T (an AMT or a CVT), as depicted in FIGS. 7 and 9, or behind the transmission-unit T, as depicted in FIGS. 8 and 10. The electromotor/generator-unit EM/G can be added as a separate module to the conventional driveline consisting of combustion engine VM and transmission-unit T. The starter-motor and the generator (alternator) can then be omitted, since their functions will be fulfilled by the EM/G-unit.

In FIGS. 11 and 12, two concepts are schematically depicted for a rearwheel driven vehicle, which use the same electromotor/generator-unit EM/G as in the earlier described frontwheel driven vehicle.

FIG. 13 depicts a further embodiment of the vehicle comprising the transmission-system according to the invention. Here a machine EM/G is included that can be used as a motor and as a generator. EM/G is connected to an energy-accumulator in the form of an electrochemical battery. At this point, it is already mentioned that in the preferred embodiment, EM/G can be an electrical machine but also for instance a hydromotor/pump combination. EM/G is connected to a rotational member c of an epicyclic gearing P, where the other two rotational members a and b of the epicyclic gearing P are connected to the input shaft $i_1$ and the output shaft $i_2$ of the transmission-unit T, respectively. Rotational member b is furthermore connected to the driven load L or a body directly connected to that. Rotational member a can be disengaged from the crankshaft of the combustion engine through clutch $K_2$ and/or be connected to the fixed world (transmission-housing) through brake R. The clutch $K_1$ can either be the clutch between the crankshaft of the engine and the input shaft $i_1$ of the transmission-unit, or the clutch between the output shaft $i_2$ of the transmission-unit and the driven load L. The clutches $K_1$ and $K_2$ must both be able to transmit torque while slipping, as is common for any force-closed clutch. The brake R does not have to fulfill this requirement and can therefore also be a form-closed clutch. In the present embodiment of the vehicle according to the invention the brake R is even conceived as the combination of a form-closed and a one-way clutch, to simplify its operation. This combination will still be referred to as brake R.

In FIGS. 14 to 17 several constructional variants of the electromotor/generator-unit shown in FIG. 13 are depicted as a module. The electromotor/generator-unit comprises a stator 101 with electrical windings, a secondary gear 102, a secondary shaft 103, a brake 104 of the clutch R, a rotational member 105 of the epicyclic gearing P, a clutch body 106 of the further clutch $K_2$, a one-way bearing 107, a gear 108 of the epicyclic gearing P, a carrier body 109 of the epicyclic gearing P, a rotor 110 of the electromotor/generator, a gear 111 of the epicyclic gearing P, a primary shaft 112, and preferably three planet gears 113 of the epicyclic gearing P. The primary shaft 112 is connected to the clutch body 106 of the further clutch $K_2$. The brake 104 of clutch R acts at rotational member 105 of the epicyclic gearing P. The planet gears 113 are supported by bearings on carrier body 109. The carrier body 109 holds a toothed gear which connects to secondary gear 102. The rotor 110 is directly connected to free gear 111 of the epicyclic gearing P. The running radii of the gears 108 and 111 which run on planet gear 113 are equal, which gives the epicyclic gearing as depicted in FIGS. 14-17 an epicyclic transmission ratio z of 1, as in a differential gear. Both gears 108 and 111 are preferably embodied as so-called 'crown-gears'. The advantage of crown-gearing above the conventional bevel-gearing for a differential gear is its high transmission efficiency (>98%) on the one hand, and less critical alignment requirements for gears 108, 111, 113 and carrier body 109 of the epicyclic gearing P, on the other.

The configurations shown in FIGS. 14-17 all have the same components 101-113, but differ in their construction regarding the position of the rotor (left or right in the figures) with respect to $K_2$ and R, and the position of the clutches $K_2$ and R (left or right in the figures).

The FIGS. 14-17 show what the construction of the electromotor/generator may look like, albeit no preferred embodiment can be identified as yet; this has to be based on detailed constructional configurations, and depends on how the unit will be mounted in the vehicle configurations as depicted in FIGS. 7-12.

Although above the invention has been elucidated using the drawings, it should be stated that the invention is in no way limited to the embodiments depicted in these drawings. The invention also extends to all embodiments that deviate from those depicted in the drawings, within the context defined by the appending claims.

As an example, in the first, second and third embodiment the clutch C can be positioned at a location in the transmission-system different from what is depicted in these embodiments. Also, in these embodiments a brake can be connected to the third node.

Furthermore, in those embodiments where the energy source is a combustion engine, an electromotor/generator can be connected to the output shaft of the combustion engine for assisting the combustion engine.

Further, in the depicted embodiments an additional clutch can be positioned between two of the three rotational members in order to set the epicyclic gearing into a fixed reduction.

The invention claimed is:

1. A drive unit comprising a driving source and a transmission-system connected to the driving source, the transmission-system comprising:
   an inertia mainly constituted by a flywheel;
   an epicyclic gearing comprising:
     a first rotational member connected via a first branch to a first node, said first node connected via a second branch to the inertia;
     a second rotational member connected via a second first branch to a second node, said second node connected via a second second branch to the driving source; and
     a third rotational member connected via a third first branch to a third node, said third node connected via a third second branch to a load;
   a transmission-unit with two in/outputs comprising a first in/output connected via a third branch, not comprising part of any of the first branch, second branch, second first branch, second second branch, third first branch, or third second branch, to one of the first, second or third node and a second in/output connected via a second third branch, not comprising part of any of the first branch, second branch, second first branch, second second branch, third first branch, or third second branch, to another of the first, second or third node; and
   at least one clutch positioned in the third branch or the second third branch, wherein the second rotational member is operatively inseparable from the driving source,
   wherein the transmission unit comprises one of: an interruptible transmission unit wherein the two in/outputs are coupled to each other via a number of gears configured to be interrupted, and a continuously variable transmission unit.

2. The drive unit according to claim 1, wherein the transmission-unit is positioned between the second node and the third node, and the clutch is positioned between the transmission-unit and the second node.

3. The drive unit according to claim 1, wherein at least one of the first, second, and third nodes is located on a shaft, and a brake is positioned on the shaft.

4. The drive unit according to claim 1, wherein the third rotational member is connected to a secondary shaft of the transmission unit by a single gear pair.

5. The drive unit according to claim 1, wherein the third rotational member is connected to a secondary shaft of the transmission unit by two single gear pairs one of which is part of a final reduction gear between the transmission unit and the load.

6. The drive unit according to claim 1, wherein the transmission-unit is of the constant-mesh type and has no synchromeshes.

7. A vehicle comprising the drive-unit according to claim 1, wherein the load comprises wheels connected to the third node.

8. The drive unit according to claim 1, wherein the driving source comprises a combustion engine and an electromotor/generator connected thereto.

9. The drive unit according to claim 1, wherein the maximum of kinetic energy of the inertia and that of the driving source differ by no more than a factor of five.

10. The drive unit according to claim 1, wherein the driving source is a high-speed combustion engine that is relatively small and lightweight.

11. The drive unit according to claim 1, wherein a ratio of the speeds of the in/outputs of the transmission-unit, when the at least one clutch is closed and the speed of the first rotational member is zero, is between the lowest and the highest possible transmission ratio of the second and third rotational members.

12. The drive unit according to claim 11, wherein the ratio of the speeds of the in/outputs of the transmission-unit is in the middle of the lowest and the highest possible transmission ratio of any two of the first, second, and third rotational members.

13. A method for preserving or increasing a driving torque at wheels of a motorized vehicle, which comprises (1) a primary driving source and (2) a transmission-system comprising:
  (a) an inertia mainly constituted by a flywheel;
  (b) an epicyclic gearing comprising:
    a first rotational member connected via a first branch to a first node, said first node connected via a second branch to the inertia;
    a second rotational member connected via a second first branch to a second node, said second node connected via a second second branch to the driving source; and
    a third rotational member connected via a third first branch to a third node, said third node connected via a third second branch to the wheels; and
  (c) a transmission-unit with two in/outputs comprising a first in/output connected via a third branch, not comprising part of any of the first branch, second branch, second first branch, second second branch, third first branch, or third second branch, to one of the first, second or third node, and a second in/output connected via a second third branch, not comprising part of any of the first branch, second branch, second first branch, second second branch, third first branch, or third second branch, to another of the first, second or third node, wherein the transmission unit comprises one of: an interruptible transmission unit wherein the two in/outputs are coupled to each other via a number of gears configured to be interrupted, and a continuously variable transmission unit;

the method comprising:
  maintaining or increasing a torque of the driving source; and
  interrupting the transmission-unit;
  wherein a transmission path from the driving source to the wheels runs through the epicyclic gearing where the inertia provides reaction torque.

14. The method according to claim 13, wherein the vehicle comprises a brake connected to the first rotational member, and further comprising activating the brake during downshifts of the transmission-unit.

15. The method according to claim 13, further comprising halting the first rotational member, thereby obtaining an additional transmission ratio between the driving source and the wheels.

16. The method according to claim 13, further comprising connecting two of the first, second, and third rotational members to each other, thereby obtaining an additional transmission ratio between the driving source and the wheels.

17. The method according to claim 13, further comprising: either halting the first rotational member, or connecting two of the first, second, and third rotational members to each other, thereby creating a fixed transmission ratio between the primary driving source and the wheels; shifting the transmission-unit into a higher gear while a clutch is open; and closing the clutch and releasing all three rotational members, thereby causing a transition towards a transmission ratio between the primary driving source and the wheels corresponding to a higher gear, without interruption of a driveline between the primary driving source and the wheels.

18. The method according to claim 13, wherein the vehicle comprises a brake connected to the first rotational member, and further comprising activating the brake during upshifts of the transmission-unit.

19. The method according to claim 13, wherein the vehicle comprises a clutch positioned in one of the third branch or the second third branch, further comprising interrupting the transmission unit by disengaging the clutch.

* * * * *